Patented Oct. 24, 1944

2,360,947

UNITED STATES PATENT OFFICE 2,360,947

MOISTUREPROOF PELLICLE

Albert Hershberger, Kenmore, N. Y., assignor, by mesne assignments, to E. I. du Pont de Nemours & Company, Wilmington, Del., a corporation of Delaware No Drawing. Application October 23, 1934, Serial No. 749,615

1 Claim. (Cl. 117—146)

This invention relates to the production of a moistureproof, transparent sheet or film, and, more particularly, it relates to the production of a non-fibrous, glass-clear transparent, moistureproof, cellulosic sheet or film, suitable for use as a wrapping tissue, containing a thermoplastic, resin-like rubber derivative.

Moistureproof, non-fibrous, transparent sheets or films have been produced heretofore, for example, by the process set forth in the patent to Charch and Prindle, No. 1,737,187 of November 26, 1929, by applying a suitable moistureproofing composition, for example, a composition including a cellulose derivative and a wax, and preferably also containing a resin and a plasticizer, on a supporting base film of non-fibrous, transparent, cellulosic material, for example, regenerated cellulose.

It has now been found that a very desirable, moistureproof, non-fibrous, transparent sheet or film, possessing good slip, transparency and flexibility, can be produced by applying to a sheet or film of non-fibrous, transparent, cellulosic material a coating composition in the form of a melted mass comprising a thermoplastic, resin-like substance, derived from rubber or a rubber solution and a halide salt or halogenated acid of a metal having a plurality of residual or so-called "secondary" valences, combined with a suitable wax or waxy material and preferably also a resin and a plasticizer, and subsequently subjecting the coated material to a temperature at least equal to the melting point of the wax in the composition.

It is therefore an object of this invention to produce a moistureproof, transparent, non-fibrous sheet or film suitable for use as a wrapping tissue.

It is another object of this invention to provide a method for producing a moistureproof, transparent, non-fibrous sheet or film possessing desirable slip, flexibility, transparency and heat sealing properties.

It is a further object of this invention to produce a moistureproof, transparent, non-fibrous sheet or film by applying a melted mass comprising a thermoplastic, resin-like substance derived from rubber or a rubber solution and a halide salt or halogenated acid of a metal having a plurality of residual or secondary valences, a wax, and preferably also a plasticizer, to a sheet of non-fibrous, transparent, cellulosic material.

It is a still further object of this invention to provide a moistureproofing composition which, when applied to a sheet of non-fibrous, transparent, cellulosic material in the molten state and subsequently dried, will form a transparent, flexible coating having desirable slipping and heat sealing properties.

Other objects of the invention will become apparent from the following detailed description.

In accordance with the practice of this invention, the objects may be attained in general by coating a suitable cellulosic base sheet or film with a melted composition comprising a thermoplastic, resin-like substance obtained by reacting rubber or a rubber solution with a halide salt or halogenated acid of a metal having a plurality of secondary valences, a moistureproofing wax, and preferably also a blending agent and a plasticizer. The coated sheet or film is then subjected to a temperature at least equal to the melting or crystallization point of the wax in the composition, the excess coating composition removed therefrom and the coating suitably smoothed and dried. When the base sheet or film is composed of a material which will lose a substantial amount of the moisture content thereof in the process of coating the same, the completed sheet or film may be submitted to a humidifying treatment, which is preferably carried out at an elevated temperature.

In accordance with the preferred form of the invention, regenerated cellulose or cellulose hydroxy ethers such as glycol cellulose, sheets or films are contemplated as base sheets. However, base sheets composed of other materials may be used to advantage, especially such sheets as may be obtained by coagulation or precipitation from aqueous cellulosic dispersions, for example, alkali-soluble cellulose ethers, such as lowly substituted methyl or ethyl cellulose; cellulose carboxy ethers, such as lowly substituted cellulose glycollic acid; cellulose derivatives, such as cellulose acetate or benzyl cellulose; treated paper; also, materials coated with non-moistureproofing compositions; and albuminous materials such as gelatin, agar-agar and the like.

The moistureproofing composition contemplated by this invention consists generally of a thermoplastic, resin-like rubber derivative of the type to be more specifically described hereinafter, a wax, and preferably also a resin and a plasticizing agent.

As the thermoplastic, resin-like, rubber derivative is contemplated a product obtained by reacting rubber or a rubber solution with a halide salt or halogenated acid of a metal having a plurality of secondary valences, such as tin tetrachloride or tetrabromide, antimony pentachloride, titanium tetrachloride, boron trichloride, ferric chloride, antimony trichloride, boron trifluoride, fluoboric acid, chlorostannic or chlorostannous acid and the like, as described by Thies and Clifford in the "Journal of Industrial and Engineering Chemistry," vol. 26, p. 123 (1934). The thermoplastic, rubber derivative obtained in the above mentioned manner through the use of tin compounds has been found to be particularly desirable as a film-forming ingredient. These products are commonly known as and will be referred to hereinafter as thermoplastic rubber derivatives of the Plioform type. Boron, which is sometimes classified as a metal and at other times classified as a non-metal, for the purposes of this invention, is considered as a metal and included as such in the above definition.

As the preferred moistureproofing constituent of the moistureproofing composition a paraffin wax is contemplated and preferably a high melting point paraffin wax, that is to say, paraffin wax having a melting point of at least 55° C. The higher melting paraffins, especially those melting above 60° C., yield coatings having a higher degree of moistureproofness, as well as exhibiting an improved slip and freedom from smearing in the final product. Alternatively, any other wax or wax-like substance capable of moistureproofing may be used, or may be used in combination with paraffin wax of the higher melting point type. Among such waxes may be mentioned certain animal and vegetable waxes such as, for example, carnauba wax, shellac wax, candelilla wax, beeswax, Japan wax, Chinese insect wax and the like. Certain synthetic waxes or wax-like materials such as, for example, hydrogenated castor oil, chlorinated naphthalene, esters of long chain alcohols and long chain fatty acids, etc. may also be used in combination with the moistureproofing wax above mentioned. The use of hard waxes, such as carnauba wax and candelilla wax is particularly desirable in these compositions in that they materially improve the hardness and slip of the coatings.

Certain resins or blending agents are preferably included in the coating composition in order to improve the transparency and gloss of the coated sheet. In general, the addition of resins also improves the adhesion of these coatings to the base sheet and improves the heat sealing properties of the latter. Those resins are preferred which are compatible with both the thermoplastic rubber derivative of the Plioform type and the moistureproofing agent, such resins serving to blend the rubber derivative with the paraffin. In the presence of such resins, a higher percentage of paraffin may be used in the coating composition without producing hazy or blushed coatings. Both natural and synthetic resins may be used for this purpose, among which may be mentioned, rosin, ester gum, hydrogenated rosin, hydrogenated ester gum, naphthyl, ethyl and benzyl esters of abietic acid, zinc and calcium resinate, modified glyceryl phthalate resins, modified phenol-formaldehyde resins, gum damar, both dewaxed and undewaxed, cumar-indene resins, chlorinated diphenyl resins, and so forth. Obviously, these resins may be used either alone or in any desired combination with each other.

As above mentioned, it is also desired to use a plasticizing agent in the moistureproofing coating composition. The presence of a plasticizer in these coatings materially improves their flexibility so that they may be bent, creased and in other ways handled without cracking or peeling from the base sheet. The plasticizer, in addition, serves to improve the heat sealing properties of the coated sheet. Those plasticizers are preferred which are good solvents for the rubber derivatives of the type above mentioned, and they may be either solid or liquid. Among the plasticizers which have been found to be desirable for use in these coatings, the following may be mentioned:

Dicyclohexyl phthalate,
Dixylyl ethane,
Ethyl palmitate,
Tricresyl phosphate,
Dicresyl carbitol,
Diethylene glycol dihydrorosinate,
Benzyl abietate,
Crepe rubber, and the like. Again, as in the case of the other constituents of the coating composition, these plasticizers may be used either alone or in combination with each other as may be desired.

The relative proportions of the solid ingredients constituting the coating composition may vary within comparatively wide limits depending upon the specific materials used and/or the properties desired in the final product. The proportion of the thermoplastic, rubber derivative of the Plioform type used in the composition may range from 10% to 40%, based on the weight of the solids in the coating composition, although the preferred range is between 20 and 30%. When the said rubber derivative is present in higher concentrations, the resulting coatings are found to be hazy or blushed, while at low concentrations of the rubber derivative the heat sealing characteristic of the coating is poor. The concentration of the wax or wax-like material may range from 10 to 75%. Paraffin wax, as well as some of the other waxes mentioned above, is well known to have a very strong tendency to crystallize. Consequently, it was considered impossible to obtain the advantages of a high paraffin wax content without producing a translucent or at least a hazy or blushed film. Contrary to expectations, it has been found that a rubber derivative of the Plioform type exhibits an unexpected and surprising action on paraffin and similar waxes, namely, that it inhibits the crystallization thereof to such a degree that coatings of the usual total thickness of 0.00005" to 0.00014", as used in the application of wax-containing pyroxylin coatings, remain clear, flexible and moistureproof, and due to the permissible higher wax content have a very desirable slip and freedom from tackiness.

The proportion of resins, when used, may also vary within wide limits, depending upon the type of resin used and the type of coating desired, to yield satisfactory results. The softer resins such as the cumar-indene resins may be used at least partially to displace the plasticizer, and consequently may be added in larger proportions than the harder resins such as rosin. The concentration of the various resins, therefore, may range from 0 to 60% with a preferred range of 20 to 40%.

The concentration of the plasticizing agent in the composition may range from 0 to 20%, depending upon the percentages of the other ingredients in the composition and the necessity of an agent to improve the flexibility of the product and to improve the heat sealing properties thereof.

The various coating compositions may, of course, be modified in many ways without departing from the spirit of the invention. For example, various desirable effects may be secured by the use of powdered mica, pigments, fish scales, metallic salts and the like, in the coating composition. Furthermore, oil-soluble dyes may be added to the coating composition where a transparent, colored coating is desired.

In preparing a coating composition melt of the type above described, the following method is preferred. The ingredients are placed together in a mixer or shredder which can be heated. The temperature of the mixture is raised to about 100° C. and the mixture is kneaded from 2 to 4 hours until it is uniform. The mixture may be examined from time to time to determine when complete dispersion has taken place and when a sample is uniform and free from lumps, the mixture is removed and is ready for use in coating the base sheet.

Alternatively, the thermoplastic rubber derivative may first be dissolved in a suitable solvent such as, for example, toluene, and the other ingredients added to the solution in the desired amounts, after which the solvent is evaporated at an elevated temperature. The solvent removal may be speeded up by carrying out the evaporation under reduced pressure. When the solvent has been completely removed, there remains a uniform melt consisting of the thermoplastic rubber derivative of the Plioform type completely dispersed in the other ingredients of the composition. The former method of obtaining a melt is preferred because it is more rapid and also less expensive. On the other hand, it may in certain cases be necessary to use the latter method in order to get a particular composition into a smooth, homogeneous, molten mass.

The base sheet may be coated with the above described compositions in a manner described in my U. S. A. Patent 2,159,151 of May 23, 1939, and consists in general, in passing the sheet through a melted composition which is maintained at a temperature of 85 to 100° C., by means of an electrically heated oil bath. Immediately after the sheet has been passed through the melted composition, the excess coating which is still in the molten state is removed by means of hot doctor knives. These knives are preferably heated to a temperature equal to that of the melt or somewhat higher. Best results are obtained by passing the coated sheet between several sets of doctor knives, in which case the first set of knives removes the excess coating and the other sets of knives have a smoothing out action upon the coating, thus eliminating streaks thereon.

After the coated sheet leaves the last set of doctor knives, the coating is still in the molten condition, and it is essential that the coating be allowed to cool and solidify before it comes in contact with any rolls or other parts of the coating apparatus. The cooling of the coating may be accomplished in any desired manner such as by blowing a cold blast of air against the melted coating surface.

The coated sheet may then be subjected to a humidifying treatment to restore the original moisture content and flexibility to the base sheet. This humidifying treatment is preferably carried out at an elevated temperature sufficiently high at least partially to melt the coating composition in order that it may temporarily lose a portion of its impermeability so as to permit moisture from the surrounding atmosphere to diffuse therethrough into the inner base which is thus softened.

To more clearly set forth the practice in accordance with this invention and to more specifically point out the nature of the composition contemplated thereby, several specific, illustrative examples are hereinafter set forth, it being understood that these examples illustrate several embodiments which have given satisfactory results and are not intended to restrict the invention thereto.

*Example I*

| | Parts by weight |
|---|---|
| Thermoplastic, resin-like rubber derivative of the Plioform type | 25 |
| Montan wax | 75 |

The above coating applied to a finished, dry and softened, regenerated cellulose pellicle is glass-clear, has good slip and a fair heat seal, and has a permeability value of about 130.

*Example II*

| | Parts by weight |
|---|---|
| Thermoplastic resin-like rubber derivative of the Plioform type | 21 |
| Paraffin (melting point 62°) | 16 |
| Montan wax | 63 |

The above coating applied to a finished, dry and softened regenerated cellulose pellicle is glass-clear, has good slip, fair heat seal, and a permeability value of about 150.

*Example III*

| | Parts by weight |
|---|---|
| Thermoplastic, resin-like rubber derivative of the Plioform type | 25 |
| Montan wax | 55 |
| Rosin | 20 |

The above coating applied to a finished, dry and softened, regenerated cellulose pellicle is glass-clear, has fair slip, fair heat seal, and a permeability value of about 100.

*Example IV*

| | Parts by weight |
|---|---|
| Thermoplastic, resin-like rubber derivative of the Plioform type | 24 |
| Paraffin (melting point 62°) | 30 |
| Montan wax | 30 |
| Rosin | 16 |

The above coating applied to a finished, dry and softened, regenerated cellulose pellicle is glass-clear, has fair slip, fair heat seal, and a permeability value of 120 or less.

*Example V*

| | Parts by weight |
|---|---|
| Thermoplastic, resin-like rubber derivative of the Plioform type | 13 |
| Paraffin (melting point 62°) | 33 |
| Shellac wax | 47 |
| Crepe rubber | 7 |

The above coating applied to a finished, dry and softened, regenerated cellulose pellicle is glass-clear, has good slip, poor heat seal, and a permeability value of 500 or less.

*Example VI*

| | Parts by weight |
|---|---|
| Thermoplastic, resin-like rubber derivative of the Plioform type | 27 |
| Gum damar | 55 |
| Montan wax | 15 |
| Benzyl abietate | 3 |

The above coating applied to a finished, dry and softened, regenerated cellulose pellicle is glass-clear, has good slip, good heat seal, and a permeability value of about 50 or less.

Example VII

| | Parts by weight |
|---|---|
| Thermoplastic, resin-like rubber derivative of the Plioform type | 33 |
| Montan wax | 50 |
| Rosin | 14 |
| Diethylene glycol dihydrorosinate | 3 |

The above coating applied to a finished, dry and softened, glycol cellulose pellicle is glass-clear, has good slip, good heat seal, and a permeability value of 165 or less.

Example VIII

| | Parts by weight |
|---|---|
| Thermoplastic, resin-like rubber derivative of the Plioform type | 14 |
| Paraffin (melting point 62°) | 50 |
| Shellac wax | 9 |
| Rosin | 17 |
| Crepe rubber | 10 |

The above coating applied to a finished, dry and softened, glycol cellulose pellicle is glass-clear, has poor slip, good heat seal, and a permeability value of 165 or less.

For the purposes of this specification and claim, we define moistureproof materials as those which, in the form of continuous, unbroken sheets or films, permit the passage of not more than 690 grams of water vapor per 100 square meters per hour, over a period of 24 hours, at approximately 39.5° C. plus or minus 0.5° C., the relative humidity of the atmosphere at one side of the film being maintained at least at 98%, and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C. plus or minus 0.5° C. (preferably 39.5° C. plus or minus 0.25° C.), with a water vapor pressure differential of 50–55 mm. (preferably 53.4 plus or minus 0.7 mm.) of mercury. For convenience, the number of grams of water vapor passed under these conditions may be referred to as "the permeability value." An uncoated sheet of regenerated cellulose having a thickness of approximately 0.0009" will show a permeability value of the order of 6900.

A moistureproof, transparent, flexible sheeting can be prepared in accordance with the above invention having a high content of a paraffin wax or like moistureproofing agent, which product will exhibit very desirable slip, transparency, and heat-sealing and moistureproofing properties.

A further advantage of this invention is that the moistureproofing composition may be applied without the use of a solvent, which thereby eliminates the possibility of a residual odor from the solvent in the final product.

Obviously, various changes and modifications may be made in the above detailed description without departing from the nature and spirit thereof. It is therefore to be understood that the invention is not to be limited to the specific modification except as set forth in the appended claim.

I claim:

A transparent sheet wrapping material comprising a base sheet of regenerated cellulose coated with a moistureproofing coating composition consisting of:

| | Parts by weight |
|---|---|
| Thermoplastic, resin-like rubber derivative of the Plioform type | 27 |
| Gum damar | 55 |
| Montan wax | 15 |
| Benzyl abietate | 3 |

ALBERT HERSHBERGER.